United States Patent [19]

Findlay et al.

[11] 3,929,959
[45] Dec. 30, 1975

[54] METHOD FOR PRODUCING ORIENTED PLASTIC SHOTSHELLS

[75] Inventors: Donald Urquhart Findlay; Francis Hamnet Garland McGaffrey; Derek Edgar Alexander Scuffell, all of Brownsburg, Canada

[73] Assignee: Canadian Industries Limited, Montreal, Canada

[22] Filed: Oct. 1, 1973

[21] Appl. No.: 402,593

[30] Foreign Application Priority Data
Oct. 30, 1972 United Kingdom............... 49843/72

[52] U.S. Cl................ 264/292; 102/43 P; 264/296; 264/322; 264/DIG. 66
[51] Int. Cl.² ........................................ B29C 17/02
[58] Field of Search ............ 264/292, 294, 322, 323

[56] References Cited
UNITED STATES PATENTS

| | | | |
|---|---|---|---|
| 2,987,775 | 6/1961 | Albrecht et al..................... | 264/323 |
| 3,074,115 | 1/1963 | Albrecht et al..................... | 264/323 |
| 3,205,290 | 9/1965 | Covington et al. ................. | 264/292 |
| 3,284,560 | 11/1966 | King et al. .......................... | 264/292 |
| 3,492,387 | 1/1970 | Larson............................. | 264/292 |
| 3,514,468 | 5/1970 | Sutcliffe et al.................. | 264/292 X |

OTHER PUBLICATIONS

Encyclopedia of Polymer Science and Technology, Vol. 6, Sections "Extrusion," New York, Interscience, 1967, pp. 466–467.
Whittington, Lloyd R., "Whittington's Dictionary of Plastics," Stamford, Conn., Technomic, c1968, pp. 101, 169, 230.

*Primary Examiner*—Philip Anderson
*Attorney, Agent, or Firm*—Donald G. Ballantyne

[57] ABSTRACT

An integral, oriented polyolefinic shotshell is provided by a method whereby a blank of material is forced partway through an annular die and over a mandrel to form the tubular portion of the shell. The unformed portion of the blank is compressed to form the head of the shell and the completed shell is then withdrawn from the die and removed from the mandrel.

3 Claims, 4 Drawing Figures

METHOD FOR PRODUCING ORIENTED PLASTIC SHOTSHELLS

This invention relates to a new method for producing one-piece oriented shotshells from highly crystalline polyolefins. In particular, the method of the invention provides for the production of high tensile strength polyolefinic shotshells wherein the tube of the shotshell and the head end and base wad are an integral unit.

It has long been the desideratum of the ammunition industry to provide an economic, safe and efficient method for the production of highly oriented one-piece crystalline plastic shotshells and a number of proposals have been put forward to achieve these ends. For example, Covington et al. in U.S. Pat. No. 3,198,866 proposed a method of producing plastic tubular members of high tensile strength which could then, by subsequent additional operations be converted into metal-headed plastic shotshells. King et al. in Canadian Pat. No. 860,034 proposed a method of making a plastic shotshell case by the working of a cup-shaped blank by means of a draw punch and draw die. Metcalf et al. in Canadian Pat. No. 865,968 similarly employ a die and plunger method to deform a cup-shaped blank of plastic material within a cavity. Koschade in Canadian Pat. No. 839,148 utilizes a process wherein a molten thermoplastic is injected into a mold to form a slug which is thereafter cooled and comprssed into the desired shotshell shape. The prior art methods are not completely free of drawbacks which tend to limit their commercial utilization. They may, for example, require slow, multi-stage and hence uneconomic operations; they may entail difficulty of control of the process conditions or they may yield a product of variable quality.

It is the object of this invention to provide a method for rapidly and economically manufacturing a high quality integral, one-piece, plastic shotshell.

To achieve this object, the present invention provides a method of producing an integral, oriented, crystalline polyolefinic shotgun cartridge comprising the steps of:

a. heating an elongated, open-ended, thick-walled tubular blank of crystalline polyolefinic material to a temperature between about 80°F. and 240°F., but below the crystalline melting point of said polyolefinic material, b. forcing said heated blank longitudinally for a distance equal to part of its length through an annular space defined by a fixed external die and a moveable internal mandrel in such a way that said blank is expanded circumferentially over said mandrel and reduced in wall thickness by extrusion through said annular space to form a biaxially oriented tubelike structure;

c. compressing the portion of said tubular blank which has not been advanced through said annular space into the shape of a formed, shotshell head and base wad integral with the said oriented tubelike structure;

d. retracting the said internal mandrel and formed tubelike structure and integral shotshell head through the said die on the action of the movement of the die, and e. removing said formed tubelike structure and integral shotshell head from the said mandrel.

The invention will be more easily understood by reference to the accompanying description and drawings in which corresponding numerals refer to the same parts and in which.

Figure 1:
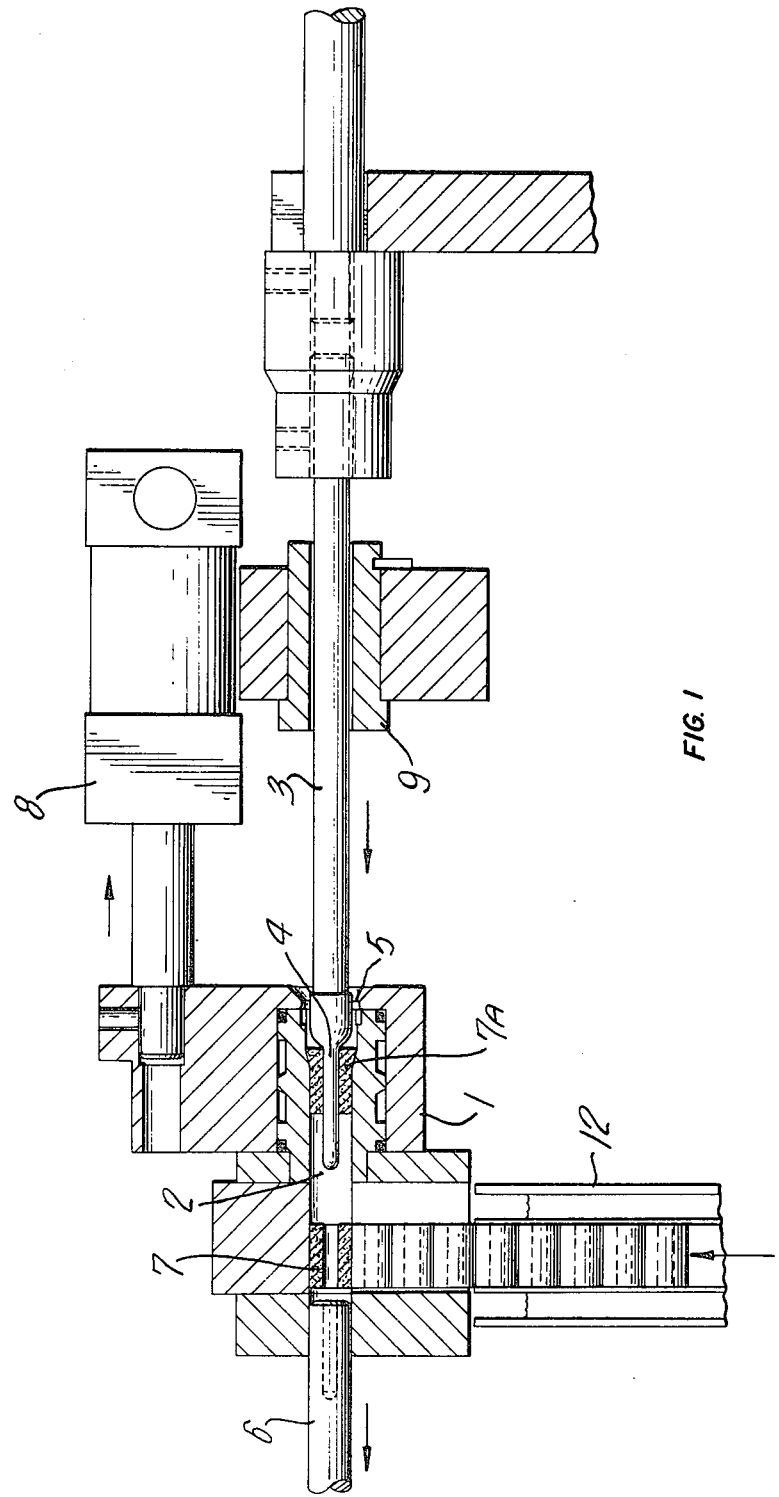
FIG. 1 is an elevational view partly in cross-section showing the apparatus of the invention ready to process a blank of polyolefinic material.
Figure 2:
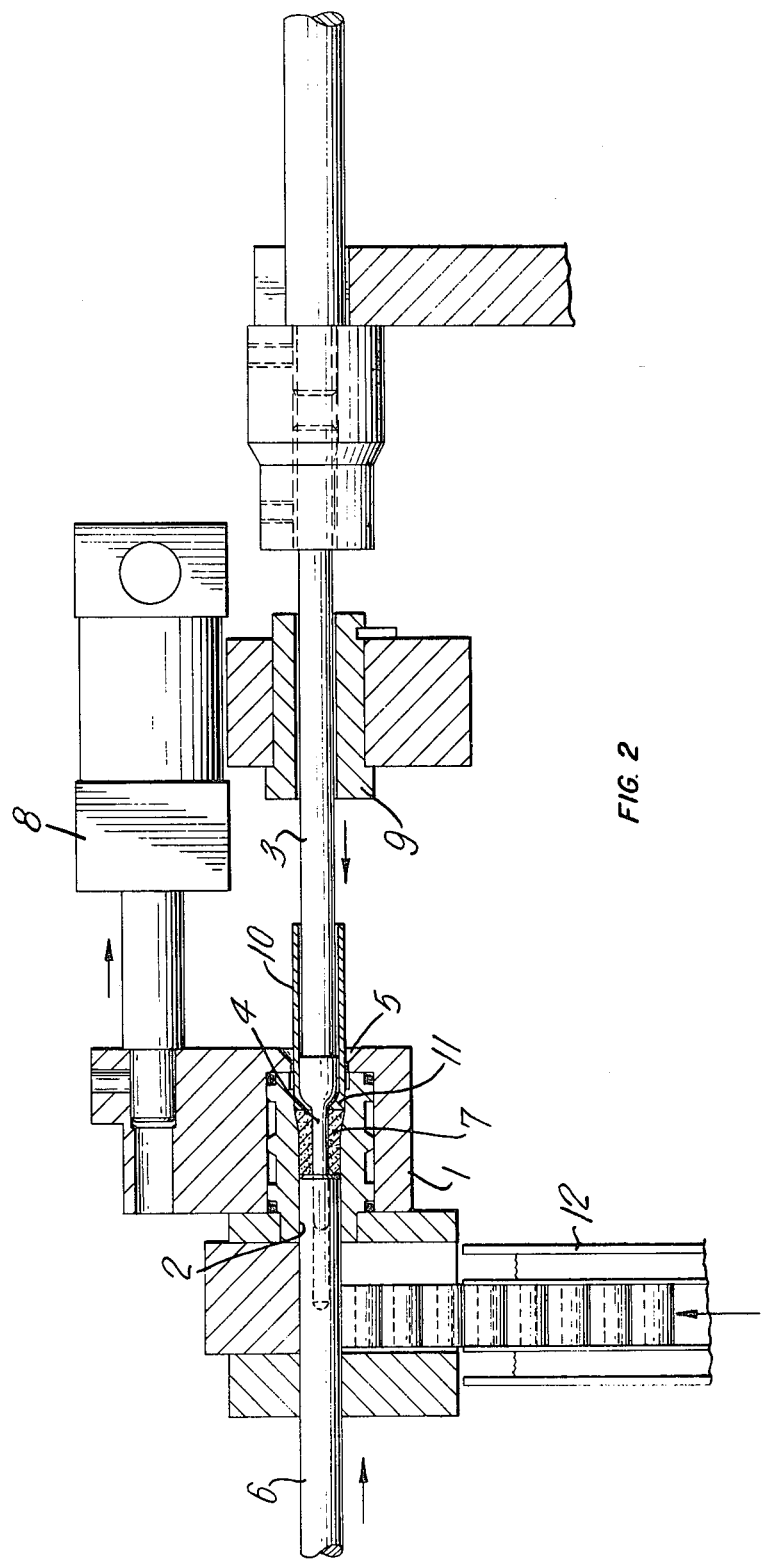
FIG. 2 shows the apparatus of FIG. 1 with the blank of material partly shaped into a tubelike shotshell structure.

With reference to the drawings and according to the preferred embodiment of the process of the invention there is shown in FIG. 1 a heated die assembly 1 having a substantially cylindrical opening 2 therethrough. Retractable mandrel 3 is shown with its tapered end 4 partly closing off cylindrical opening 2 in die 1. Tapered end 4 conforms to the desired base wad configuration within finished shotshell. An annular space 5 is formed between mandrel end 4 and the walls of opening 2. Thick-walled tubular blanks 7 are shown passing upward through a feeding and heating means 12 for feeding to opening 2. A retractable ram 6 is adapted to advance tubular blanks 7 into opening 2 and a previously advanced blank 7A is shown encircling taper 4 of mandrel 3. Die assembly 1 may be locked in position by hydraulic piston 8. Retractable mandrel 3 and ram 6 are moved in and out of opening 2 by pneumatic or hydraulic piston (not shown). Surrounding the mandrel 3 is tripper piece 9. The apparatus as depicted in FIG. 1 represents the relationship of the parts at the beginning of the operating cycle. Referring to FIG. 2, which depicts the first stage in the operating cycle, ram 6 is shown as having moved forward into opening 2 and carrying a blank 7 before it. The force of ram 6 causes blank 7A to be pushed against and over the tapered end 4 of mandrel 3 which is locked in place, and to be partly extruded through annular space 5 in the form of tubular shotshell body 10. Preferably die 1 at space 5 is notched to produce a corrugated effect on the outer surface of body 10. Simultaneously the head-end 11 of shotshell body 10 is formed by the force exerted by ram 6 and blank 7 upon the unextruded portion of blank 7A within opening 2 of die 1 and against the tapered end 4 of mandrel 3.

Figure 3:
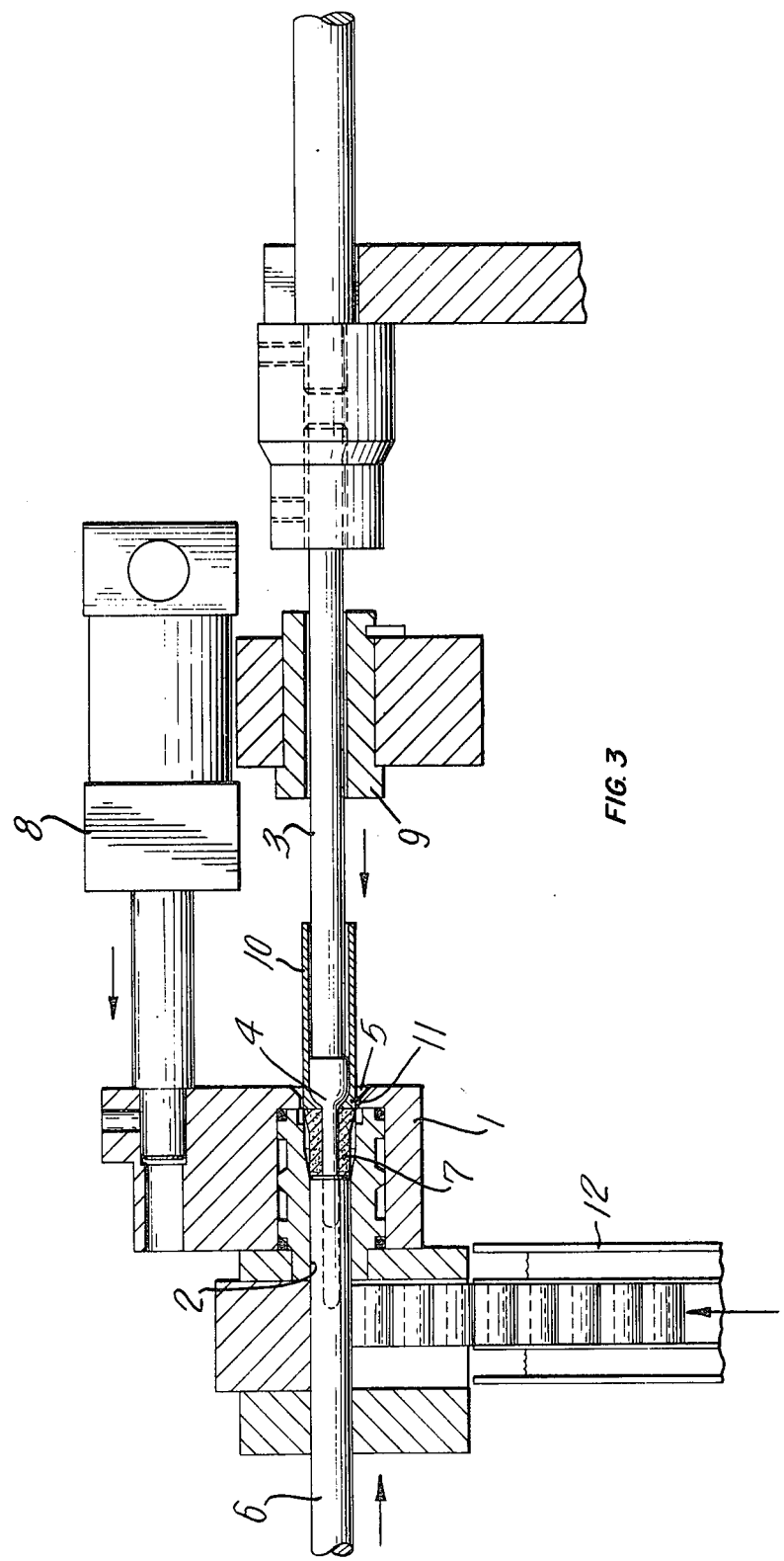
FIG. 3 shows the apparatus of FIG. 1 with the blank of material fully shaped.
Figure 4:
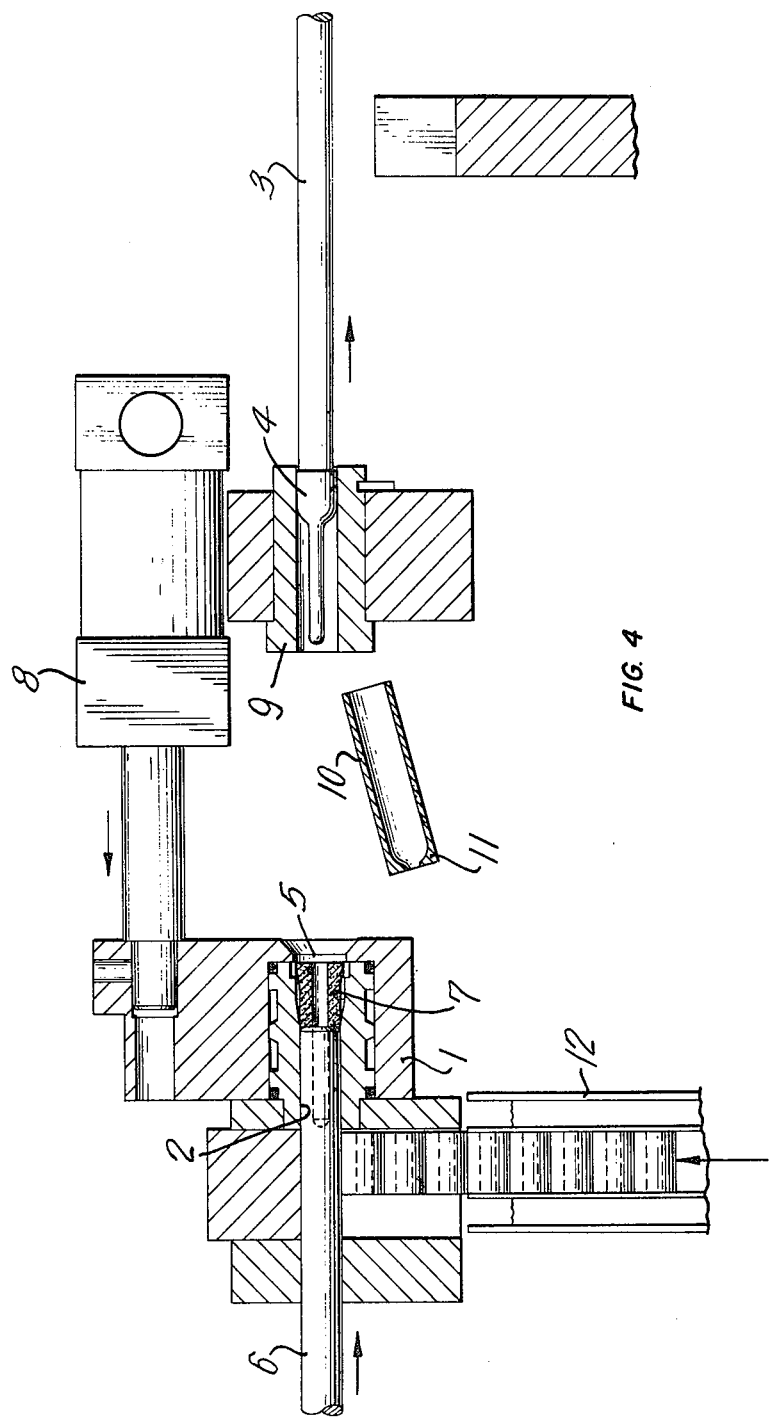
FIG. 4 shows the apparatus of FIG. 1 with the fully shaped tubelike shotshell structure being discharged from the apparatus.

Referring to FIG. 3, which depicts the second stage in the operating cycle, die assembly 1 is disengaged by means of hydraulic piston 8 and allows the integral head end of shotshell body 10 to pass through opening 2 and separate from die 1. The corrugated effect is thus carried over the full length of body 10. FIG. 4 shows the final stage of the cycle when mandrel 3 is unlocked and retracted through stripper piece 9 and the completed formed shotshell body 10 with integral head-end 11 is removed or stripped from mandrel 3. Ram 6, mandrel 3 and die 1 can then be repositioned as in FIG. 1 for the start of a successive cycle.

It may be seen that unlike prior art processes, the present invention makes use of a moveable mandrel axially positioned within a moveable forming die, which combination allows for simultaneous shotshell tube orientation and headend forming and also permits the simple and quick removal of the finished shotshell from the forming die.

The crystalline polyolefinic suitable for use in the process of the invention for manufacture of shotshells is preferably a high density polyethylene having a density of from about 0.942 to about 0.965. However, other suitable polymeric or copolymeric polyolefinic materials as such or in blended form, such as polypropylene or mixtures of polypropylene and polyethylene may be utilized. It will be appreciated that while the process and apparatus of the invention has particular utility in the production of one-piece oriented high strength shotshells, other similarly shaped cup-like bodies may be manufactured in a like manner. The choice, therefore, of the appropriated thermoplastic material will depend on the qualities sought in the end product.

A wide range of working temperatures may be employed in the working of the thermoplastic blank into the completed shotshell so long as the recrystallization temperature of the thermoplastic is not exceeded. The plastic blank and the orienting and forming die are preferably maintained in the range of 130°F. – 170°F. when using a high density polyethylene. The pressures employed in the working pistons associated with the ram, die and mandrel will generally vary between about 5 and 15 tons and will depend on the material being worked and the temperatures employed.

The size of the tubular, thick-walled blank will be such as to provide the total plastic material needed and so its size will depend on the desired dimensions of the finished shotshell and can be applied to a wide range of calibres. The blanks will of necessity be constant in size and material of composition from blank to blank and will be free of flaws, gels and voids. The blanks are preferably made by cutting off successive lengths of a continuous tubular extrudant. However, the blanks can readily be made by injection moulding techniques so that blanks with shapes slightly modified from the tubular form to compensate for uneven or unusual shrinkage patterns in the final component may be utilized. Lubrication of the blanks by, for example, preheating in a constant temperature lubricant bath aids in maintaining high production rates precluding the need for a dwell time, and the heating feeding unit 12 in the drawings may usefully combine the function of heating and lubrication of the blanks. Generally, the requirements for optimum plastic extrusion conditions are known from the prior art.

The tubular, thick-walled blank for subsequent formation into a 20 guage shotshell, for example, will generally be about 1.11 inches in length and have an outside diameter of about 0.675 inch and in inside diameter of about 0.250 inch. It has been found that best results are achieved when the blank has the same outside diameter as the finished body of the shotshell and is processed through a die of essentially parallel bore of a diameter chosen to accommodate the slug dimension. It is, however, possible to form shells from blanks which are smaller or larger than the finished shells. These operations, of course, require appropriately modified die bore profiles to allow for contraction or expansion of the blank as it is formed into the finished shell.

Similarly, the mandrel may be modified in form to provide for a substantial taper over approximately half of its parallel working surface at the pilot end, such that the wall of the finished plastic shell will demonstrate a thicker section of as much as .050 inch, immediately adjacent to the base wad portion and tapering backwards gradually to meet the uniform .030 inch wall thickness. This constitutes a preferred configuration, as it exerts a favourable influence on the external profile of plastic casing by precluding preferential shrinkage of the thicker base section immediately adjacent to a thinner wall section.

Shotshell produced according to the process of this invention have been found to have a longitudinal tensile strength of from about 20,000 psi to about 30,000 psi. Circumferential tensile strengths of shotshells produced range from about 5,500 psi to about 8,500 psi.

What we claim is:

1. A method of producing an integral, oriented, crystalline polyolefinic shotgun cartridge comprising the steps of:
   a. Heating an elongated, open-ended, thickwalled tubular blank of crystalline polyolefinic material to a temperature between about 80°F. and 240°F., but below the crystalline melting point of said polyolefinic material,
   b. forcing said heated blank longitudinally for a distance equal to part of its length through an annular space defined by a fixed external die and a moveable internal mandrel in such a way that said blank is expanded circumferentially over said mandrel and reduced in wall thickness by extrusion through said annular space to form a biaxially oriented tubelike structure;
   c. simultaneously compressing by the use of a ram acting through a further heated blank the portion of said tubular blank which has not been advanced through said annular space into the shape of a formed, shotshell head and base wad integral with the said oriented tubelike structure;
   d. retracting the said internal mandrel and formed tubelike structure and integral shotshell head through the said die on the action of the movement of the die, and
   e. removing said formed tubelike structure and integral shotshell head from the said mandrel.

2. A method according to claim 1 wherein the said tubular blank is heated to a temperature between about 130°F. and 170°F.

3. A method according to claim 1 wherein the crystalline polyolefin is high density polyethylene.

* * * * *